March 29, 1960    J. P. DE ROSE    2,930,428
POWER ADJUSTABLE SEAT MOUNT
Filed Aug. 26, 1955    3 Sheets-Sheet 1
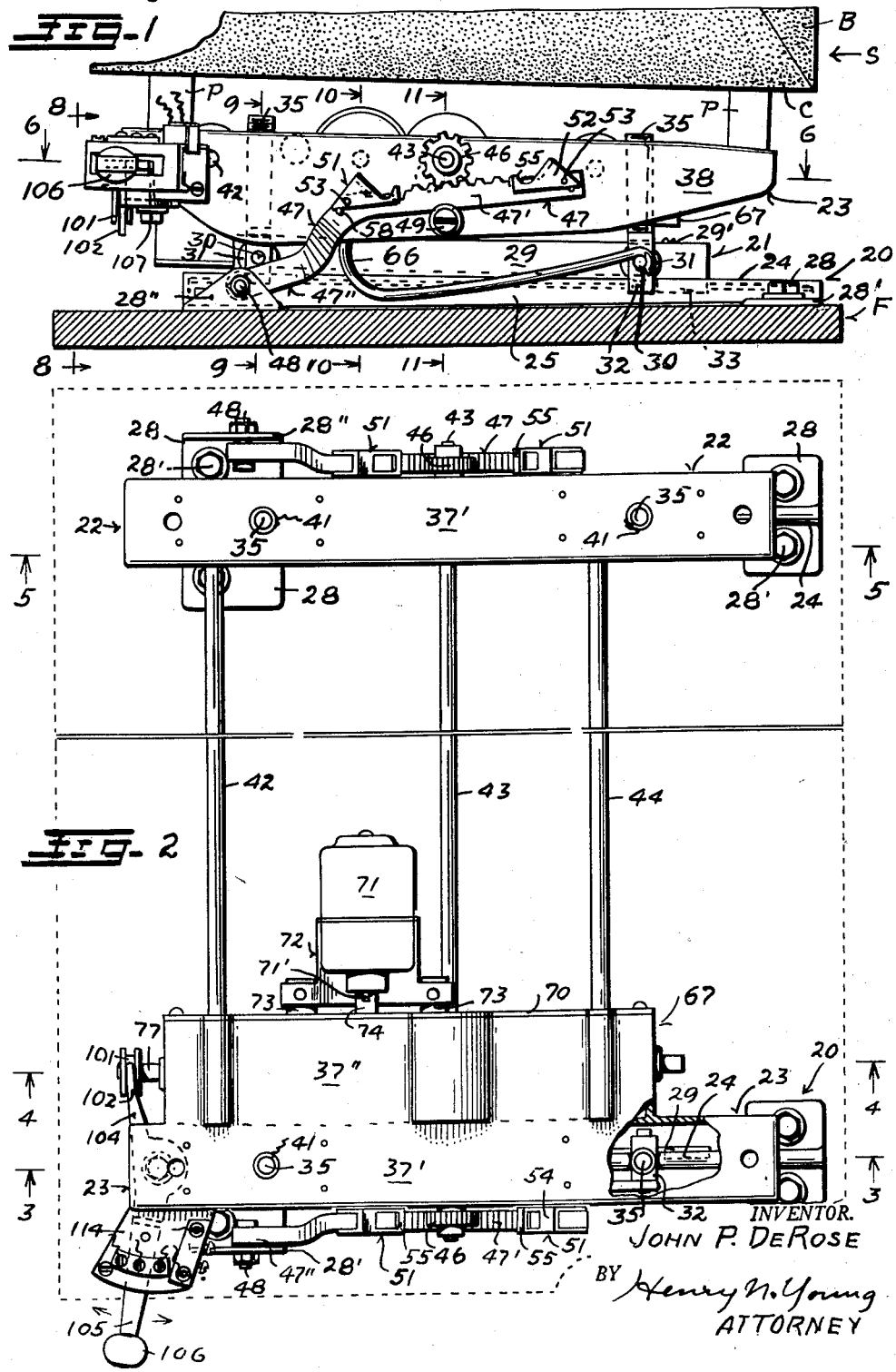
INVENTOR.
JOHN P. DeROSE
BY Henry N. Young
ATTORNEY March 29, 1960  J. P. DE ROSE  2,930,428
POWER ADJUSTABLE SEAT MOUNT
Filed Aug. 26, 1955  3 Sheets-Sheet 2
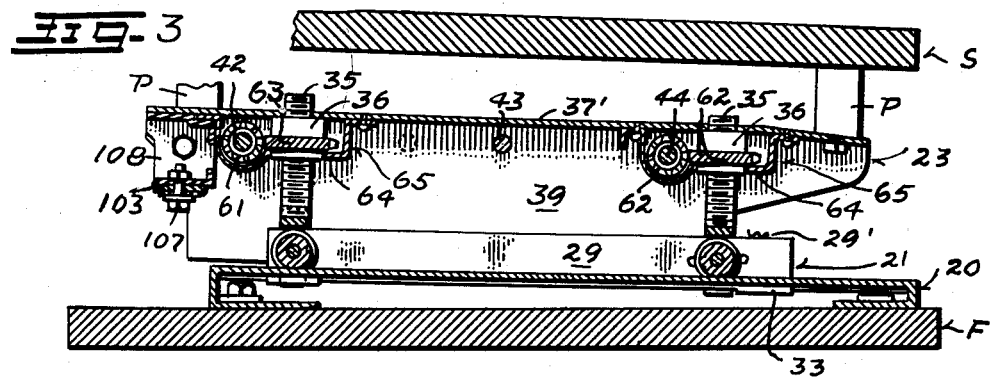
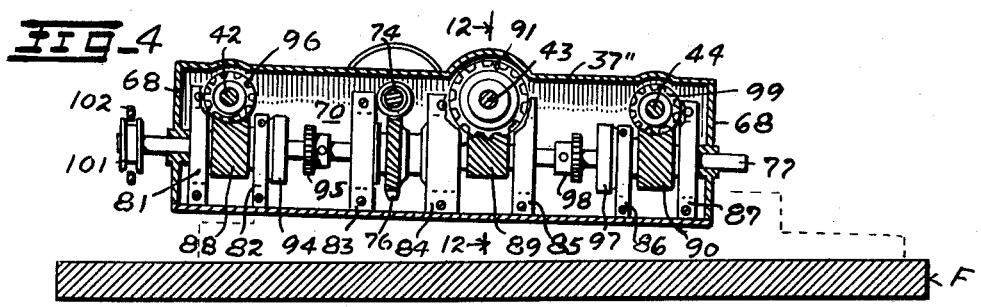
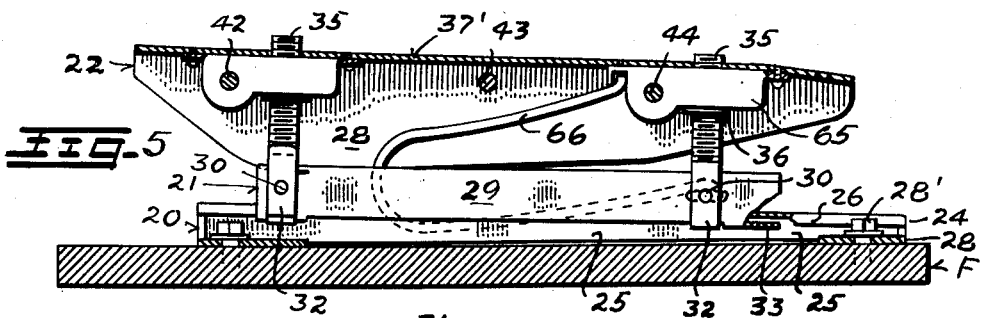
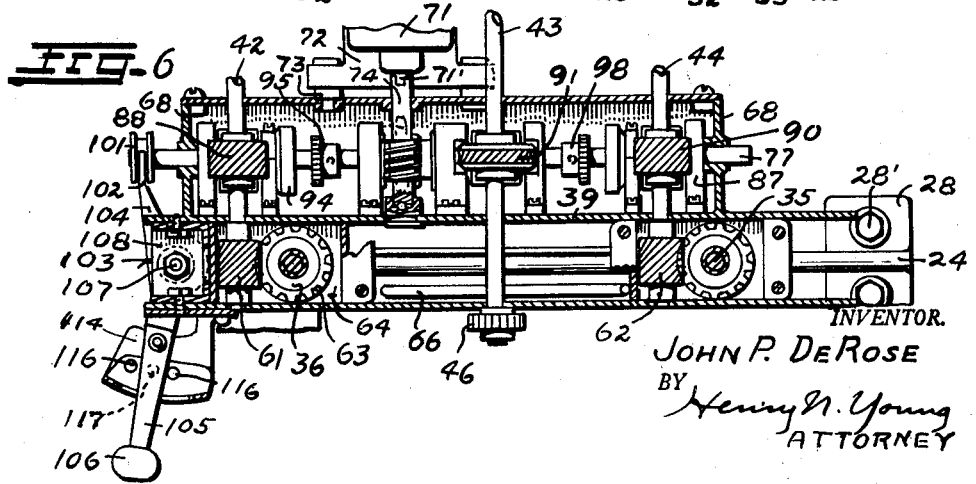
INVENTOR.
JOHN P. DE ROSE
BY Henry N. Young
ATTORNEY

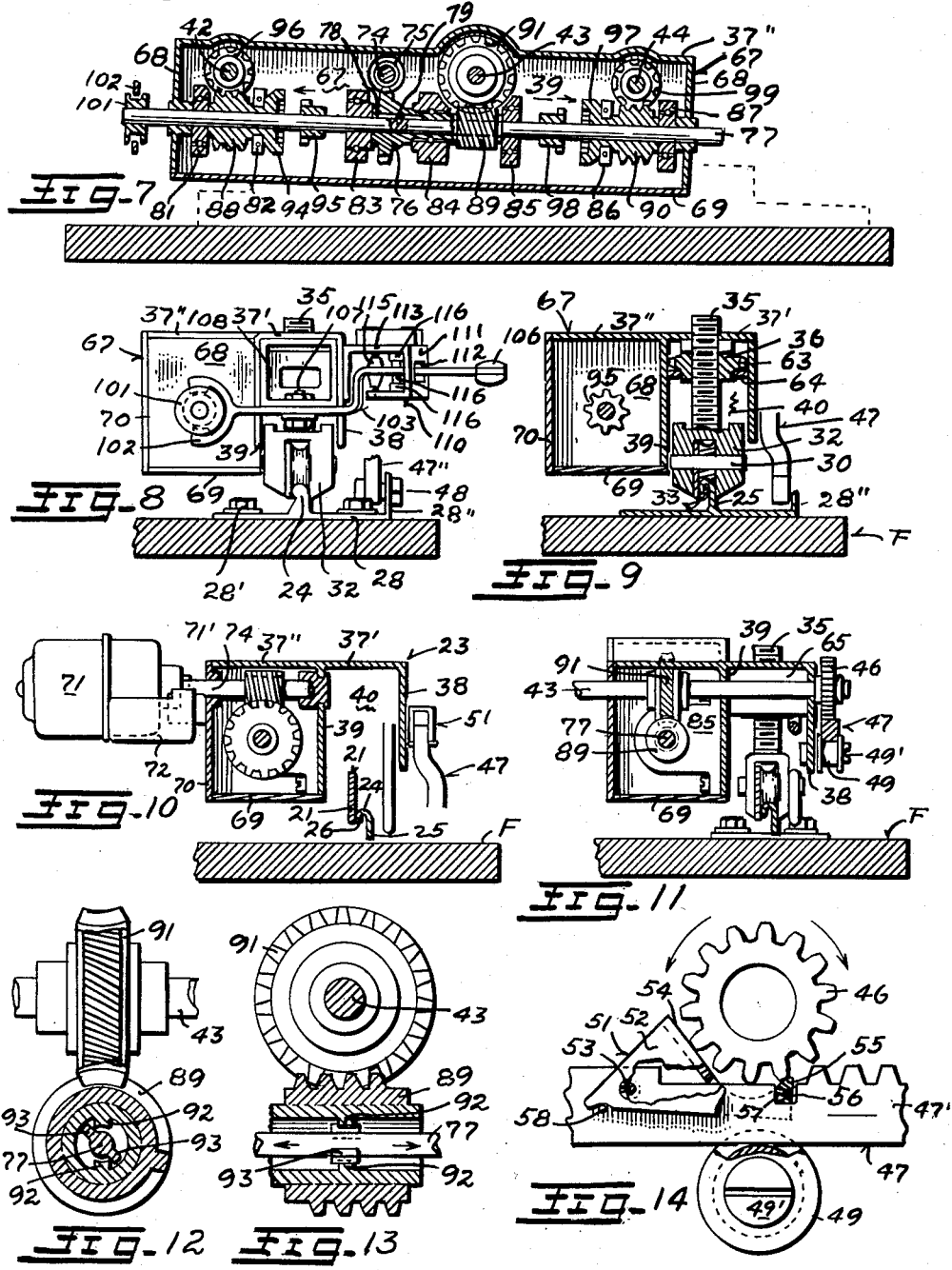

United States Patent Office 2,930,428
Patented Mar. 29, 1960

2,930,428

POWER ADJUSTABLE SEAT MOUNT

John P. De Rose, Clearlake Oaks, Calif.

Application August 26, 1955, Serial No. 530,837

11 Claims. (Cl. 155—14)

The invention relates to an adjustable support for a seat.

The present seat support assembly generally comprises a structure for supporting a seat from a floor-engaging base thereof and providing for mutually independent height and/or angularity and/or fore-and-aft adjustments of the seat to most comfortably fit and position different occupants of the seat, and a principal object is to provide such a seat support having its said adjustments under the selective control of a common power means.

Another object is to assure equalized height adjustments for a supported seat at opposite sides of the seat.

A further object is to provide a seat support provided with particularly simple devices for effecting its adjustments.

A more specific object is to provide an adjustable seat support which is particularly adapted for use by an operator of the controls of a motor-driven vehicle, with all adjustments effected and controlled by and from an electric motor which is powered by a storage battery provided by such a vehicle.

The invention possesses other objects and features of advantage, some of which, with the foregoing, will be set forth or will be apparent in the following description of a typical embodiment thereof, and in the accompanying drawings, in which, Figure 1 is a fragmentary left-side view of a seat-mounting structure embodying the features of the present invention, and shown as supporting a seat from a floor in an adjustably set position.

Figure 2 is a plan view of the seat-support of Fig. 1 taken below the supported seat.

Figure 3 is a sectional view taken at the line 3—3 in Fig. 2.

Figure 4 is a sectional view taken at the line 4—4 in Fig. 2.

Figure 5 is a sectional view taken at the line 5—5 in Fig. 2.

Figure 6 is a plan section taken at the line 6—6 in Fig. 1.

Figure 7 is an axial section of a transmission mechanism shown in Fig. 4.

Figure 8 is a front view of the left-side support of Fig. 1.

Figure 9 is a section taken at the line 9—9 in Fig. 1.

Figure 10 is a section taken at the line 10—10 in Fig. 1.

Figure 11 is a section taken at line 11—11 in Fig. 1.

Figure 12 is an enlarged partly sectional view taken at the line 12—12 in Fig. 4.

Figure 13 is a partly sectional view taken at the line 13—13 in Fig. 12.

Figure 14 is an enlarged fragmentary and broken-away elevation of part of a gear and rack assembly shown in Figs. 1 and 2.

The features of present invention are shown as embodied in the structure of a unitary assembly which supports a seat S, having a cushion C and a back B, upon a supporting surface such as that provided by a floor F. The present seat is of a usual upholstered type having a rigid bottom plate or frame for its direct mounting upon the present adjustable support structure, said structure having been particularly designed for its installation for the mounting of a seat in a motor-driven vehicle for use by the operator or other riders in the vehicle, though applicable to seats generally wherever its types of adjustment are advantageous. The present seat-supporting assembly generally comprises a pair of complementary base members 20 for fixed disposal on a floor F in laterally spaced and parallel relation to extend upwardly from the floor beneath the different seat ends in fore-and-aft relation to the seat, mutually complementary intermediate members 21 carried on the base members 20 for solely fore-and-aft adjustments therealong, and members 22 and 23 for fixing to a seat bottom adjacent its right and left sides respectively to depend therefrom and having complementary portions thereof adjustably connected to the corresponding intermediate members 21 for mutually independent front and rear height adjustments of the seat for setting its height and angularity to best suit a particular user. A seat S may be secured to and above the top members 22 and 23 in any suitable manner, as by posts or blocks P fixed to and between the seat bottom and forward and rear points of the members.

The present base members 20 each include an elongated track portion 24 of J-section disposed in an inverted position and having its wide flange 25 outermost with respect to the assembly and integrally connected with its narrow flange 26 by a cylindrically rounded portion which is engageable as a track by rollers supporting the intermediate member 22 thereon for fore-and-aft adjustments of a supported seat. At its ends, the bottom edge of each flange 25 is integrally connected to floor-engaging plates 28 extending transversely thereof and providing foot bearings by which the members 20 may, if desired, be secured to a floor F as by bolts 28'. For reasons to be hereinafter brought out, the upright flange 25 is widest at its front to provide a rearward sloping of the track, while the flange 26 is of uniform width.

It will now be noted that each intermediate member 21 comprises an elongated plate 29 which transversely and rotatively receives through spaced holes thereof laterally spaced axles 30 which are carried by grooved rollers 31 by which the member 21 is supported on the track 24 in rollably adjustable supported relation thereto. As particularly shown, the axles 30 are fixed in and through the sides of support blocks 32 which are forked to span the upper track portion and receive the plates 29 between their inner arms 32' and the rollers, with the axles 30 extending through bores in the plates whereby the latter act as spacers between the associated blocks. At opposite ends thereof, and as brought out in Figures 3 and 9, inturned hook-like ear extensions 33 at the bottom of each plate 29 extend beneath the edges of the associated narrow track flange 26 in close opposed adjacency thereto whereby the ears 33 are operative to prevent a lifting of the intermediate member 21 from the track.

Elevator or jack screws 35 extend upwardly from the roller-supported blocks 32 in integral relation thereto with their axes mutually parallel and intersecting the axes of the engaged support axles 30 in mutually perpendicular relation thereto, and said screws are engaged through nuts 36 which are rotatably mounted on the upper support members 23 in angularly fixed relation thereto and are arranged for their turning to utilize the screws to adjustably and variably space the front and rear ends of the member 23 from the supporting track 24 provided by the base member 21 while the screws are held in fixed angular relation to the members 23. The top of the slot provided between the sides of a fork block 32 is preferably slightly spaced from the opposed top edge 29' of the associated plate 29 whereby to permit a slight rocking of the members 23 with respect to the screws 35 as required by the independent height adjustments at the front and rear of the supported seat which is further made possible by having the rearmost holes of the plates 29 which receive the rear roller-supported axles 30 elongated longitudinally of the plates to permit a full range of relative angular adjustment of the members 23 with respect to the supporting members 22.

A consideration of the showing of Figures 2 and 3 and 5 discloses that the upper left side support member 23 has a portion thereof comprising a complementary counterpart of the member 22 and that corresponding parts of the members are, for convenience, generally designated by like characters of reference. Referring particularly to the left side support member 23, it will now be noted that the same comprises, in part, a top plate 37 having flat plates 38 and 39 depending perpendicularly and integrally from side edges of an outer plate portion 37' to define outer and inner sides respectively of an inverted channel space 40 of uniform width therealong. The right side upper member 22 provides only the top plate portion 37' having said plates 38 and 39 depending therefrom to define a channel 40, and the top plates 37' of both members 22 and 23 are provided with openings 41 freely receiving the upper ends of the jack screws 35 therethrough. Shafts 42 and 43 and 44 are journalled in and between aligned transverse bearing bores provided in the side plates 38 and 39 of both of the upper members 22 and 23, said shafts being arranged for their selective rotation to respectively effect the various front-height and fore-and-aft and rear-height adjustments provided for the supported seat.

By particular reference to Figures 1 and 2 and 14, it will now be noted that spur gears 46 are mounted on the extending ends of the shaft 43 and so engage rack bars 47 extending from forward points of the base members 20 that appropriate rotations of the shaft may effect like forward or rear adjusting movements of the members 22 and 23 along the supporting tracks 24. As shown, the forward ends of the racks 47 are hingedly connected by hinge pins 48 to ears 28" extending upwardly from the front foot plates 28 of the base members 20, and idler rollers 49 mounted on stub shafts 49' extending from the outer upright side plates 38 of the members 22 and 23 opposite and below the gears 46 on the shaft 43 constantly cooperative with the hinge pins 48 to support the rack bars 47 for the required limited and unhindered reciprocation of the racks by the gears, the gears 46 and rollers 49 being so spaced and related as to permit the necessary slight rocking of the rack portions 47' about the pins 48 which are in appreciably spaced relation from the rack portions 47' of the bars. By reason of the sloping of the support tracks 24 from their forward ends, it will be understood that the action of gravity constantly urges a rearward disposal of the seat as it is held set by the engagement of the racks 47' with the positioning gears 46.

Means are preferably provided in association with the rack bar 47 for limiting the fore-and-aft adjustments of the seat within a permitted range. In the present structure, the rack portion 47' of the rack bar 47 is straight and of uniform thickness and is transversely offset from the forward bar portion 47" through which the hinge pin 48 engages. Both ends of the rack portion 47' are provided with a means for limiting the movement of the rack bar while the gear 46 is rotating in the direction which would continue the movement of the bar. As is particularly brought out in Figure 14, members 51 are hingedly mounted on the rack portion 47' of a bar 47 beyond the toothed portion thereof and comprise generally triangular side or cheek plates 52 receiving the rack bar between them and hinged to the bar by hinge pins 53 engaging them at adjacent corners thereof which are farthest from the rack teeth. Edge portions of the plates 52 extending above the receiving rack bar portion are connected by a plate 54 providing a cylindrically convex upper face, and a cross bar 55 connects the forward ends of the plates opposite a cross notch 56 provided in the bar in lieu of a terminal rack tooth thereof. A compression spring 57 is normally operative between the cross bar 55 and the bottom of the notch 56 to urge the assumption by the cross bar of a position in line with the rack teeth as permitted by the engagement with the lower edge of a cheek plate 52 of a stop pin 58 extending from the bar 47 in the plane of movement of the cheek plate.

When the operation of the gear 46 has moved its teeth out of engagement with the rack teeth and against the plate 54 of a member 51, said member is displaced by the gear teeth from its normal position against the resistance of the spring 57, and the gear teeth thereafter merely slip along the face of the plate 54 as long as the shaft rotation is continued in the same direction. If, however, the rotation of the gear 46 is reversed, a gear tooth will engage the cross bar 55 as a ratchet tooth and thereby shift the rack bar 47 to render the teeth of the reversed gear operative to shift the rack bar toward its other limiting position. In this manner, an over-loading of a motor which actuates the shaft 43 is avoided, yet the gear 46 is constantly operative to provide a desired fore-and-aft shifting of the seat when the shaft 43 is appropriately rotated.

It will now be noted that the forward shaft 42 is arranged to simultaneously actuate the nuts 36 on the forward jack screws 35 by and upon a rotation of the shaft, and that the rear shaft 44 is similarly operative with respect to the nuts 35 on the rear jack screws 35. Essentially, the different shafts 42 and 44 respectively mount worms 61 and 62 within the spaces 40 of the members 22 and 23, and the nuts 36 peripherally provide worm gears 63 which constantly engage the different worms 61 and 62, whereby the rotation of a shaft 42 or 44 may effect a raising or lowering of the corresponding nuts to raise or lower the front or rear of the seat. As particularly shown, the upper hub ends of the nut-gears 36 bear against and beneath the top plate portions 37' at screw-receiving openings 41 therethrough for supporting the members 22 and 23 on the nuts.

For preventing an appreciable raising of the members 22 and 23 from their normally seated positions on the screw-carried nuts 36 and securing the nuts in fixed angular relation to the members, plate members 64 are provided beneath the nuts in close opposed adjacency thereto, said plates closely receiving the lower hub portion of the nuts 36 through openings therein and comprising portions of members 65 which are fixedly supported from and beneath the top plate portions 37' of the members 22 and 23 and are cooperative with the latter members to provide enclosures for the nuts 36 and the gears 61 or 62 engaged by them while securing the nuts in fixed angular relation to the members 23 which carry them. As particularly shown, planar C-shaped springs 66 have the upper and lower ends thereof seated against and between the top plate portions 37' and the extending ends of the corresponding rear roller axles 30 as a counterbalance for the seat at its rear.

A common means is preferably provided for selectively actuating the shafts 42 or 43 or 44 for effecting the described adjustment controls by action of the different shafts. Said shaft-actuating means presently and preferably, though not essentially, comprises an electric motor arranged to selectively operate the different shafts and is mounted on a rectangular transmission casing 67 provided on the upper support member 22 and having its space 67' defined by a portion of the upright plate 39 of the member, an inward lateral extension 37" of the top plate 37, upright front and rear walls 68, a bottom wall 69, and a removable side closure plate 70 for the inner side of the transmission casing 67 thus defined. As is particularly brought out in Figures 2 and 4 and 6 and 7, an electric motor 71 is dismountably carried by a bracket 72 which is removably mounted on studs 73 extending transversely and inwardly from the side plate 70 of the transmission casing 67, and an end of the motor shaft 71' is releasably interlocked with the opposed extending end of a shaft 74 journalled in and between the casing walls 39 and the plate 70 to provide for an actuation of the shaft 74 from the engaged motor shaft 71' when the motor is operating.

Intermediately of its part within the casing space, the drive shaft 74 provides a worm 75 fixedly related thereto and arranged for its constant engagement with a worm gear 76 carried on a shaft 77 extending longitudinally through the casing 67 and arranged for its longitudinal shifting through the bore of the hub of said worm gear. The shaft 77 is longitudinally and oppositely shiftable from its illustrated intermediate position in which it is arranged for its use in effecting a driving of the shaft 43 which controls the fore-and-aft positioning of the seat to limiting forward and rearward positions in which the height-adjusting shafts 42 and 44 may be selectively actuated for adjusting the seat height at its rear or front respectively. By particular reference to Figure 7, it will be noted that the shaft-receiving bore of the hub of the worm gear 76 is splined to the shaft 77; as shown, the gear 76 is provided with an axial spline groove 78 which is arranged for the constant engagement therein of a key 79 extending radially and fixedly from the shaft 77, said spline groove being long enough to constantly receive the key 79 for all longitudinally adjusted positions of the shaft within the hub bore; the arrangement is essentially such that the shaft 77 will be rotated in all of its three adjusted positions whenever the drive shaft 74 is rotating, whereby the latter shaft comprises its drive shaft with respect to its present selective power transmitting device.

Aside from its more or less sealed bearing extension through the front and rear end walls 68 and 69 of the casing 67, the shaft 77 is directly or indirectly journalled in suitable anti-friction bearing assemblies mounted on the plate 39 within the casing space 67' and designated in order from the forward casing end as 81 and 82 and 83 and 84 and 85 and 86 and 87, different of said bearings being further utilized, aside for their bearing functions, to engage the shaft-carried worm gear 76 and worms 88 and 89 and 90 carried on the shaft against any axial shifting thereof. By particular reference to Figure 7, it will be noted that the hub of the worm gear 76 is confined between the bearings 83 and 84, the worm 88 is held in position by its coaction with the bearing 82, the worm 89 is positioned by and between the bearings 84 and 85, and the worm 90 is held in position by appropriate coaction with the bearing 86.

By particular reference to Figures 7 and 12 and 13, it will be noted that the worm 89 constantly meshes with a worm gear 91 which is fixedly mounted on the shaft 43 which is operative to effect fore-and-aft adjustments of the seat in the previously described manner. As illustrated, an extending end of the hub of the worm 89 is journalled at the bearing 84 in coaxial relation with the shaft 77, and the bore of the hub within the worm is larger than the shaft 77 and is provided intermediately thereof with inwardly-extending radial lugs 92 which are engageable with radial lugs 93 of the shaft 77 solely when the shaft 77 is in its intermediate set position. In this manner, the shaft 43 may be actuated from the shaft 77 only while the lugs 92 and 93 are mutually coplanar for their engagement, said lugs being relatively short axially of the shaft 77.

It will now be noted that the hub of the worm 88 is extended rearwardly to provide a clutch disc 94 comprising a socket having circumferentially internal clutch teeth within it for complementary engagement with radial clutch teeth provided by a clutch plate 95 fixed on the shaft 77 between the disc 94 and the bearing 83. The arrangement is essentially such that a forward shifting of the shaft 77 is limited by the interengagement of the clutch elements 94 and 95 to then effect an operative connection of the worm 88 with the shaft, it being noted that Figure 7 discloses the shaft as positioned for actuating the intermediate worm 89. It will also be noted that the worm and its associated clutch disc are separated by an annular groove in which the bearing 82 is operative to maintain the position of the worm in the casing space 67' to constantly engage a worm gear 96 mounted on the shaft 42 for its operation to effect height adjustments at the seat front in the previously described manner. With reference to the worm 90, it is noted that the structure of the same is similar to that of the worm 88 whereby it provides a clutch disc 97 at its forward hub end for engaging a clutch plate 98 mounted on the shaft 77, and is held positioned in constant engagement with a worm gear 99 mounted on the shaft 44 by the engagement of the bearing 86 with it.

Understanding that the described connections between the motor shaft and the various seat positioning shafts 42 and 43 and 44 provide a selective power transmission device from the actuating motor 71 which operates through the shaft 74 to selectively drive the screw adjusting shafts, means are provided for shifting the shaft 77 of the transmission to provide a desired adjustment. As particularly shown, the extending forward end of the shaft 77 mounts a grooved wheel 101 with which a shift fork 102 is cooperative to optionally dispose the shaft 77 in any one of the three positions thereof in which the shafts 42 or 43 or 44 are actuated. By particular reference to Figures 1 and 2 and 3 and 6 and 8, it will be noted that the positioning of the shift fork 102 is under control of a hand lever 103 having an arm 104 carrying the fork at its extremity and an arm 105 provided with a handle knob 106 at its extremity, the lever being intermediately pivoted by means of a pivot bolt 107 to a bracket member 108 extending forwardly from within the upper support member 23; as shown, the lever arm 105 extends laterally from the left side of the support member 23 and below a seat S which is mounted on the support posts P in overlying spaced relation to the top plane of the members 22 and 23.

A detent means is preferably provided for selectively securing the hand lever 103 in at least its intermediate position in which the shaft 77 is connected with the shaft 43. In the present structure, a generally rectangular bracket 110 extends fixedly from the forward end of the outer side plate 38 of the left-side upper support member 23, and this bracket provides an outer side face member 111 provided with a slot 112 extending in a fore-and-aft direction and receiving the lever arm 105 therethrough for a limited swinging thereof which permits the three optimal settings of the transmission-control shaft 77. Opposed, and generally parallel, upper and lower members 113 and 114 of the bracket 108 preferably provide aligned sockets in which spring-pressed detents 115 mounted on the lever arm 105 may engage when the lever is in its intermediate set position in which the shaft 43 is connected with the shaft 77 through the worm 89, whereby the intermediate setting of the shaft 77 may be found and yieldingly maintained.

While the primary drive-shaft 74 of the described power transmission is shown as arranged to be actuated by the electric motor 71 as a generally preferred means for effecting the various adjustments, it will be understood that the shaft 74 might be otherwise rotated, as by a hand-operated crank or other means. In the present arrangement using the reversible motor 71, the arm 105 of the hand lever 103 may be conveniently utilized as a switch arm of a switch assembly for energizing the motor circuit in accordance with the setting of the shaft 77, such a switch assembly being provided at the bracket 111. By particular reference to Figures 1 and 2 and 6 and 8, it will be noted that electric contacts 116 are provided in pairs on the opposed faces of the bracket members 113 and 114 in mutually insulated relation to each other and to the bracket and are engageable by an electric contact member 117 carried by the lever arm 105, the set lever being normally disposed to space the contact 117 from the fixed contacts 116 opposite its ends by reason of the action of the spring detents 115.

The motor power control switch thus provided is essentially such that when the lever arm 105 is set in its intermediate position, its transverse displacement in an upward or downward direction may provide immediate reverse fore-and-aft adjustments of the seat. Also, when the lever arm 105 is swung forwardly to connect the shaft 77 with the height adjusting shaft 44, up and down displacements of the lever arm 105, will close the motor circuit for respectively effecting up and down adjustments of the rear of the seat; similarly, height adjustments of the front of the seat may be effected when the lever arm 105 has been swung to its rearward position. When a present seat is installed in a vehicle having a storage battery and generator as part of its power plant, the required and relatively low power for actuating the electric motor 71 may be derived from said storage battery. Referring to the use of the disclosed transmission device for selectively controlling the adjusting actuations of the shafts 42 or 43 or 44, it will be noted that a disposal of the shaft 77 may be effected in either one of two intermediate positions in which this shaft is not operatively connected to any of the adjustment shafts, this being accomplished by setting the lever arm 105 in corresponding positions, it being noted that when the lower is so set is ceases to function as a switch arm of the described switch assembly.

From the foregoing description taken in connection with the accompanying drawings, the advantages of the present adjustable seat mount will be readily understood by those skilled in the art to which the invention appertains. While I have shown and described an arrangement which I now consider to be a preferred embodiment of my invention, I desire to have it understood that the showings are primarily illustrative, and that such changes and developments may be made, when desired, as fall within the scope of the following claims.

I claim:

1. In a seat support, a base member providing a straight elongated support track in fore-and-aft relation to a mounted seat, an upper seat-carrying member, an intermediate member slidable on and along said track, means connecting the upper member with the intermediate member for upright adjustments with respect thereto, and a rack-and-gear means directly connecting the upper member with the base member and operative for effecting fore-and-aft adjustments of the intermediate member along the track.

2. In a seat support, a base member providing a straight elongated support track in fore-and-aft relation to a supported seat, an upper seat-carrying member, an intermediate member slidable on and along said track, means connecting the upper member with the intermediate member for upright adjustments with respect thereto, a rack-and-gear means directly connecting the upper member with the base member for effecting fore-and-aft adjustments of the intermediate member along the track, and means under control of an occupant of the seat operative to actuate said rack-and-gear means.

3. In a seat support, laterally spaced base members providing support tracks in fore-and-aft relation to a supported seat, laterally spaced upper seat-mounting members, intermediate members slidable on said tracks, means connecting the upper members with the corresponding intermediate members for solely upright adjustments of the upper members with respect to the intermediate members, a rack-and-gear connection between an upper member and the corresponding base member for effecting a fore-and-aft adjustment of the intermediate member along the track, means under control of an occupant of the seat operative to actuate the gear of the rack-and-gear connection, and means on the rack-and-gear connection automatically operative to limit the fore and aft adjustments of the upper members.

4. In a seat support, laterally spaced base members providing support tracks in fore-and-aft relation to the seat, laterally spaced upper seat-carrying members, intermediate members slidable on said tracks, jacks connecting the upper members with the corresponding intermediate members at corresponding forward and rearward points thereof for effecting height adjustments of the upper members with respect to the intermediate members, rack-and-gear connections between the upper members and the corresponding base members for effecting fore-and-aft adjustments of the intermediate members along the tracks, and means carried by said upper members for actuation to independently and selectively adjust the forward jacks or the rearward jacks or the rack-and-gear connections.

5. In a seat support unit, laterally spaced base members providing support tracks in fore-and-aft relation to a supported seat, laterally spaced upper members for directly carrying the seat, intermediate members mounted on said tracks for adjustment therealong, jacks connecting the upper members and the corresponding intermediate members at corresponding forward and rear points of the members for operation to effect height adjustments of the upper members with respect to the intermediate members, rack-and-gear connections between the upper members and the corresponding base members for operation to effect fore-and-aft adjustments of the intermediate member along the tracks, actuator shafts carried by the upper said members and individually connected with the forward jacks and the rearward jacks and the rack-and-gear connections for independently and selectively actuating the same, a drive shaft carried by an upper member for a solely longitudinal shifting adjustment thereof between different set positions, a power transmission means including the drive shaft and arranged to selectively connect the drive shaft with the different actuator shafts for operatively rotating the connected actuator shaft in accordance with the adjusted position of the drive shaft, a reversible electric motor having a shaft connected to the said drive shaft for rotating the same, a shift fork mounted on said upper member and engaging the drive shaft for longitudinally adjusting the same, a manually settable shift lever for operating said shift fork to adjust the drive shaft setting and having a setting handle, normally open switches for the power circuit of said motor supported with the seat, and means connecting said switches with said shift lever for their selective manual closing to energize the motor for its actuation in mutually reverse directions solely while the drive shaft is connected with a said actuator shaft through said transmission means.

6. In an adjustable unitary support for a seat, a pair of laterally spaced lower members disposed in fixed angular relation to a supporting floor in a fore-and-aft relation to a supported seat, upper seat-carrying members overlying each of the first members for cooperatively mounting a seat, screw-jacks connecting the upper members and the lower members at forward and rearward points of the connected members and comprising screws non-rotatably carried by the lower said members and nuts rotatably engaging the screws and carried by the upper said members, and means carried by the nut-carrying members operative to selectively actuate the forward nuts together or the rearward nuts together for effecting like or different height adjustments of the upper members at said forward or rearward points thereof.

7. In a seat support, laterally spaced lower members disposed in fixed angular relation to a supporting floor in fore-and-aft relation to a seat, upper seat-carrying members overlying the lower members for support therefrom, screw-jacks positively connecting the corresponding upper and lower members at forward and rearward points thereof, and means carried by the upper members operative to actuate the forward screw-jacks together and independently of the rearward screw-jacks for effecting like or different height adjustments of the upper members at said jack-connected forward and rearward points thereof.

8. In an adjustable seat support, a pair of laterally spaced lower members disposed in fixed angular relation to a supporting floor in fore-and-aft relation to a seat, a pair of cooperative seat-carrying upper members overlying the first members in supported relation thereto, screw-jacks connecting the corresponding upper and lower members of said member pairs at forward and rearward points of the connected members, and comprising screws non-rotatably carried by one pair of said members and nuts rotatably engaging the screws and carried by the members of the other pair of said members, and means carried by the nut-carrying members operative to selectively actuate the forward nuts together or the rearward nuts together for effecting like or different height adjustments of the upper members at said forward and rearward points thereof.

9. In a seat support, a pair of laterally spaced base members providing mutually parallel support tracks in fore-and-aft relation to a seat, a pair of laterally spaced upper seat-carrying members, intermediate members reciprocatively mounted on said tracks, jacks connecting the upper members and the intermediate members at corresponding forward and rearward points of the members for effecting height adjustments of the upper members with respect to the intermediate members, a rack-and-gear means operative between the upper members and the corresponding base members for effecting fore-and-aft adjustments of the intermediate members along the tracks, actuator shafts carried by and between a pair of said members and individually connected with the forward jacks and the rearward jacks and the rack-and-gear means for their independent and selective adjusting actuations, a common drive shaft, means carried by the upper members for actuation by an occupant of the support-carried seat for selectively connecting said drive shaft with the said actuator shafts, and a means operable to actuate said drive shaft.

10. A structure in accordance with claim 9 whereof the last means comprises a reversible electric motor carried by the upper member, and a manually settable control switch for the motor.

11. In a seat support unit, laterally spaced base members providing mutually parallel support tracks in fore-and-aft relation to a seat, laterally spaced upper seat-carrying members overlying the different base members, intermediate members slidably mounted on said tracks, jacks connecting the upper members to the different intermediate members at corresponding forward and rear points of the members for effecting height adjustments of the upper members with respect to the intermediate members, rack-and-gear connections between the upper members and the underlying base members operative for effecting fore-and-aft adjustments of the intermediate member along the tracks, actuator shafts carried by and between said upper members and individually connected with the forward jacks and the rearward jacks and the rack-and-gear connections, and a means for selectively operating said actuator shafts including a drive shaft and a transmission means arranged for selectively connecting the drive shaft with said different actuator shafts for rotating the same and a means for oppositely actuating said drive shaft to provide opposite adjustments by the engaged actuator shaft.

References Cited in the file of this patent

UNITED STATES PATENTS

| | | |
|---|---|---|
| 2,345,182 | Corber | Mar. 28, 1944 |
| 2,596,033 | King | May 6, 1952 |
| 2,669,284 | Pall et al. | Feb. 16, 1954 |
| 2,707,137 | Hollstein | Apr. 26, 1955 |
| 2,710,047 | Duppstadt | June 7, 1955 |
| 2,712,346 | Sprinkle | July 5, 1955 |
| 2,765,024 | Brundage | Oct. 2, 1956 |
| 2,809,688 | Brundage | Oct. 15, 1957 |

FOREIGN PATENTS

| | | |
|---|---|---|
| 21,147 | Great Britain | 1891 |
| 348,853 | France | Feb. 24, 1905 |